(12) United States Patent
Tsui

(10) Patent No.: US 11,478,106 B2
(45) Date of Patent: Oct. 25, 2022

(54) PORTABLE BABY FOOD WARMER

(71) Applicant: Digital Heat Technology Ltd., Hong Kong (CN)

(72) Inventor: Nam Tsui, Hong Kong (CN)

(73) Assignee: Digital Heat Technology Ltd., Hong Kong (CN)

( * ) Notice: Subject to any disclaimer, the term of this patent is extended or adjusted under 35 U.S.C. 154(b) by 823 days.

(21) Appl. No.: 16/395,338

(22) Filed: Apr. 26, 2019

(65) Prior Publication Data

US 2020/0337495 A1  Oct. 29, 2020

(51) Int. Cl.
*A47J 36/24* (2006.01)
*A47J 36/32* (2006.01)

(52) U.S. Cl.
CPC ........... *A47J 36/2433* (2013.01); *A47J 36/32* (2013.01)

(58) Field of Classification Search
CPC ..... A61L 2/04; A61L 2/24; A61L 2/10; A61L 9/00; A61L 2/00; A61L 2/085; A61L 2/14; A61L 2202/14; A61L 2202/182; A61L 2202/122; A47J 36/2438; A47J 36/2433; A47J 36/32; H05B 3/80; A45D 20/12; G06F 3/14; G06F 3/04847; G01G 19/52; H02J 7/0042
USPC ......... 219/37, 439, 441, 448, 497, 523, 530; 392/441, 443, 444; 34/92, 96; 361/807; 250/455.11
See application file for complete search history.

(56) References Cited

U.S. PATENT DOCUMENTS

| | | | | |
|---|---|---|---|---|
| 1,445,501 A | * | 2/1923 | Dwinall | H05B 3/78 392/443 |
| 1,559,002 A | * | 10/1925 | Plastino | H05B 3/78 219/209 |
| 1,567,679 A | * | 12/1925 | Rittman | A47J 27/004 219/433 |
| 2,483,979 A | * | 10/1949 | Morrill | A47J 36/2433 215/11.1 |
| 2,918,561 A | * | 12/1959 | Perez | A47J 37/00 219/533 |
| 3,536,893 A | * | 10/1970 | Cranley | H05B 3/80 392/443 |
| 4,065,660 A | * | 12/1977 | Berard | A47J 36/2433 219/535 |
| 4,108,181 A | * | 8/1978 | Saliaris | A61F 9/007 219/233 |

(Continued)

*Primary Examiner* — Eric S Stapleton
(74) *Attorney, Agent, or Firm* — Spruson & Ferguson (Hong Kong) Limited

(57) ABSTRACT

A baby food warming system for warming baby food, including milk and other liquid or semi-liquid beverages, without using an AC power source is disclosed. The present invention provides a system including a charging case and a baby food warmer. The charging case includes an upper cover having a magnet, and a charging base having a magnetic switch, a charging connector, and an UV-C light emitting diode. The baby food warmer includes a main body having a temperature regulator, an external sensor, and an internal sensor, all at a lower tip of the main body, and a top cap attachable to the main body for closing the main body. The top cap further includes a micro-controller configured to generate control signals for controlling the temperature regulator, and to receive sensing signals from the external sensor and the internal sensor.

14 Claims, 14 Drawing Sheets

(56) References Cited

U.S. PATENT DOCUMENTS

| | | | | |
|---|---|---|---|---|
| 4,563,570 A * | 1/1986 | Johns | A61B 18/082 | 219/233 |
| 4,857,702 A * | 8/1989 | Cafaro | H05B 3/34 | 219/541 |
| 4,920,763 A * | 5/1990 | Provest | F25D 17/02 | 62/378 |
| 5,118,927 A * | 6/1992 | Eisenhauer | A47J 36/2433 | 219/505 |
| 5,337,581 A * | 8/1994 | Lott | A61L 11/00 | 422/292 |
| 5,368,384 A * | 11/1994 | Duncan | A47J 43/0705 | 366/601 |
| 5,397,031 A * | 3/1995 | Jensen | A47J 36/2433 | 222/146.5 |
| 5,436,429 A * | 7/1995 | Cline | H05B 3/36 | 219/535 |
| 5,706,390 A * | 1/1998 | O'Neil | A47J 27/21158 | 392/501 |
| 5,797,313 A * | 8/1998 | Rothley | A47J 31/402 | 366/205 |
| 5,968,396 A * | 10/1999 | Rodriguez | H05B 3/80 | 392/443 |
| 6,170,386 B1 * | 1/2001 | Paul | A47J 36/2433 | 99/275 |
| 6,222,168 B1 * | 4/2001 | Witonsky | B65D 81/3453 | 374/149 |
| 6,403,938 B2 * | 6/2002 | Witonsky | A61J 9/02 | 426/241 |
| 6,417,498 B1 * | 7/2002 | Shields | A47J 36/2427 | 219/521 |
| 6,571,564 B2 * | 6/2003 | Upadhye | A47J 36/2438 | 62/62 |
| 6,634,896 B1 * | 10/2003 | Potega | G01R 31/36 | 439/669 |
| 7,093,376 B2 * | 8/2006 | Regen | A45D 20/12 | 132/200 |
| 7,196,293 B2 * | 3/2007 | Britto | H01R 13/7038 | 219/442 |
| 8,045,848 B2 | 10/2011 | Wortley | | |
| 8,245,630 B2 * | 8/2012 | Houraney | A47J 36/2483 | 392/404 |
| 8,742,297 B2 * | 6/2014 | Zakowski | A47J 36/2433 | 392/444 |
| 9,035,222 B2 * | 5/2015 | Alexander | A47J 39/025 | 165/61 |
| 9,545,608 B2 * | 1/2017 | Kaufmann | B01F 35/2209 | |
| 9,797,621 B2 * | 10/2017 | Parzick | F24H 1/06 | |
| 10,187,929 B1 * | 1/2019 | McFadden | H05B 3/06 | |
| 10,609,767 B1 * | 3/2020 | Trost | H05B 3/80 | |
| 10,917,944 B2 * | 2/2021 | West | F24H 4/02 | |
| 11,272,807 B2 * | 3/2022 | Hanneken | A47J 36/2438 | |
| 2001/0008238 A1 * | 7/2001 | Witonsky | A61J 9/02 | 219/710 |
| 2002/0105794 A1 * | 8/2002 | Hanscom | F21V 33/0084 | 362/602 |
| 2003/0066430 A1 * | 4/2003 | Bitar | A47J 31/54 | 99/275 |
| 2003/0186592 A1 * | 10/2003 | Potega | G01K 1/02 | 374/E1.002 |
| 2003/0207603 A1 * | 11/2003 | Potega | H01R 24/58 | 439/578 |
| 2005/0194372 A1 * | 9/2005 | Lau | A47J 36/38 | 219/441 |
| 2006/0076923 A1 * | 4/2006 | Eaves | G01T 1/249 | 320/112 |
| 2006/0080857 A1 * | 4/2006 | Regen | A45D 20/12 | 34/92 |
| 2006/0272516 A1 * | 12/2006 | Carbonini | A47J 31/4489 | 99/452 |
| 2007/0207071 A1 * | 9/2007 | Silverman | A61L 2/202 | 422/186.07 |
| 2007/0236920 A1 * | 10/2007 | Snyder | F21V 29/70 | 362/157 |
| 2007/0251572 A1 * | 11/2007 | Hoya | C08L 53/02 | 174/110 SR |
| 2008/0094077 A1 * | 4/2008 | Philipp | G06F 3/044 | 324/686 |
| 2008/0095661 A1 * | 4/2008 | Kohler | C02F 1/487 | 422/119 |
| 2008/0198615 A1 * | 8/2008 | Klipstein | H05B 45/345 | 362/109 |
| 2008/0260912 A1 * | 10/2008 | Scott | G09F 23/06 | 426/87 |
| 2008/0292123 A1 * | 11/2008 | Jensen | H04R 25/00 | 381/322 |
| 2009/0038673 A1 * | 2/2009 | Ware | H02S 40/34 | 136/246 |
| 2009/0223383 A1 * | 9/2009 | Houraney | A47J 36/2483 | 99/447 |
| 2009/0296968 A1 * | 12/2009 | Wu | H04R 25/00 | 381/323 |
| 2010/0259220 A1 * | 10/2010 | Crawford | H05B 47/10 | 315/294 |
| 2011/0143000 A1 * | 6/2011 | Fiset | C12H 1/165 | 426/248 |
| 2011/0255260 A1 * | 10/2011 | Weber | H01H 13/04 | 200/341 |
| 2012/0111203 A1 * | 5/2012 | Noordhuis | A47J 31/4489 | 99/323.1 |
| 2013/0063922 A1 * | 3/2013 | La Porte | A61L 2/10 | 250/455.11 |
| 2013/0064941 A1 * | 3/2013 | Taitler | A47J 31/4485 | 219/679 |
| 2013/0312617 A1 * | 11/2013 | Toporovsky | A47J 31/005 | 99/280 |
| 2014/0183377 A1 * | 7/2014 | Bettles | A61L 2/10 | 250/455.11 |
| 2014/0264075 A1 * | 9/2014 | LaPorte | A61L 2/00 | 250/455.11 |
| 2014/0300273 A1 * | 10/2014 | LeBrun | F21V 33/0036 | 362/101 |
| 2015/0083737 A1 * | 3/2015 | Iino | B29C 49/12 | 220/675 |
| 2015/0173561 A1 * | 6/2015 | Foster | B65D 85/8043 | 215/11.1 |
| 2015/0245421 A1 * | 8/2015 | Heczko | H05B 6/1245 | 99/323.3 |
| 2015/0250346 A1 * | 9/2015 | Baston | A47J 41/0038 | 99/316 |
| 2015/0313354 A1 * | 11/2015 | Mongan | A46B 17/06 | 15/105 |
| 2016/0000953 A1 * | 1/2016 | Bettles | A61L 2/10 | 250/455.11 |
| 2016/0015209 A1 * | 1/2016 | Dunn | A47J 36/2438 | 99/483 |
| 2016/0121009 A1 * | 5/2016 | Farr | H04B 10/80 | 250/492.1 |
| 2017/0142992 A1 * | 5/2017 | Christen | A23C 9/206 | |
| 2017/0265620 A1 * | 9/2017 | Bouix | H05B 3/0014 | |
| 2018/0117192 A1 * | 5/2018 | Baranov | A61L 2/10 | |
| 2018/0200396 A1 * | 7/2018 | Messina | A61L 2/10 | |
| 2018/0296709 A1 * | 10/2018 | Mishkin | A61L 2/0047 | |
| 2018/0357385 A1 * | 12/2018 | LaPorte | A61L 2/10 | |
| 2019/0021548 A1 * | 1/2019 | Eisner | A61J 11/04 | |
| 2019/0099509 A1 * | 4/2019 | Martz | A61L 2/24 | |
| 2019/0142981 A1 * | 5/2019 | Kim | G01B 5/24 | 250/455.11 |

* cited by examiner

PORTABLE BABY FOOD WARMER

FIELD OF THE INVENTION

The present invention relates to a portable baby food warmer and, more particularly, to a heating rod for warming milk and other baby food in a baby bottle.

BACKGROUND

Babies and young infants are commonly fed with milk (formula milk or breast milk) or other baby food from a bottle. Freshly expressed breast milk can usually be stored in a refrigerator for a few days, or in a freezer for a more extended period. To prepare the refrigerated milk for use, it is necessary to warm the milk to a temperature that is close to body temperature, i.e., around 37° C. If the milk is too cold, the baby may refuse to drink the milk or may be in some discomfort when consuming the milk. If the milk is too hot, the baby may be injured and the nutritional value may be affected.

There are several ways to warm a bottle of milk, such as running warm water over the bottle, or using a baby bottle warmer. A typical example of a baby bottle warmer is U.S. Pat. No. 8,045,848 B2, which has a vessel to hold water and the milk bottle, and a heating element for heating the water held in the vessel.

The problem with the conventional baby bottle warmers is the size of the device, which has a width at least larger than the width of the milk bottle in order to immerse the milk bottle therein. As the size of the milk bottle varies, for example, a Medela™ breast milk bottle has a width of about 2.4 inches, while a Tommee Tippee™ baby bottle has a width of about 3.2 inches, the size of the baby bottle warmer cannot be too small or otherwise some of the baby bottles cannot fit into the device. Therefore, the inconsistency in the size of baby bottles creates inconveniences to parents, and the bulkiness of the existing designs of baby bottle warmer prevents the warmer from being carried around and used outside of the home.

Furthermore, baby bottle warmers are generally powered by an alternating current (AC) power source, and there is the need that such a power source being available for warming the milk. It is not conventional to have a baby bottle warmer operable as a portable device while maintaining sufficient output power to warm the milk efficiently.

Accordingly, there is a need in the art to have a warmer, preferably in the form of a heating rod, which can warm the baby food in a baby bottle. Particularly, the baby food warmer is operable as a portable device, and is immersed into the baby food in a baby bottle for delivering heat thereto without the use of an alternating current (AC) power source.

SUMMARY OF THE INVENTION

It is an object of the present disclosure to provide a portable baby food warmer for warming milk and other baby food in a baby bottle without using an AC power source.

It is an object of the present disclosure to provide a portable baby food warmer that would not operate at idle state, as any operation of the portable baby food warmer in idle state is particularly dangerous and may hurt the user.

In accordance with certain embodiments of the present disclosure, a baby food warming system comprises a charging case and a baby food warmer. The charging case comprises an upper cover having a magnet, and a charging base having a magnetic switch, a charging connector, and an UV-C light emitting diode. The baby food warmer comprises a main body comprising a temperature regulator, an external sensor, and an internal sensor, all at a lower tip of the main body, and a top cap attachable to the main body for closing the main body. The top cap further comprises a micro-controller configured to generate control signals for controlling the temperature regulator, and to receive sensing signals from the external sensor and the internal sensor.

In accordance with a further aspect of the present disclosure, the first micro-controller is configured to identify a deviation of temperature between the sensing signals from the external sensor and from the internal sensor for determining whether the temperature regulator is operating in an idle state without immersing into the baby food.

In accordance with a further aspect of the present disclosure, the external sensor is positioned at the lower tip facing outwardly for measuring the temperature of the baby food.

In accordance with a further aspect of the present disclosure, the internal sensor is positioned in the lower tip proximate to the temperature regulator for measuring the temperature of the temperature regulator.

In accordance with a further aspect of the present disclosure, the magnetic switch is a magnetically actuated electric switch responsive to a magnetic force induced by the magnet for determining whether the upper cover is connected to the charging base.

In accordance with a further aspect of the present disclosure, the magnetic switch is configured to switch on the UV-C light emitting diode when the upper cover is connected to the charging base for sterilization and disinfection of the baby food warmer.

In accordance with a further aspect of the present disclosure, the main body further comprises a second micro-controller configured to control the temperature regulator.

In accordance with a further aspect of the present disclosure, the main body further comprises a battery cavity for fixing a high power (HP) battery, wherein the HP battery is used to electrically power the temperature regulator.

In accordance with a further aspect of the present disclosure, the HP battery has an output power more than 50 W, and is detachably clipped on a positive terminal of the top cap.

In accordance with a further aspect of the present disclosure, the top cap further comprises an LCD and a plurality of touch sensing electrodes.

In accordance with a further aspect of the present disclosure, the first micro-controller is configured to generate a plurality of control signals for controlling the LCD.

In accordance with a further aspect of the present disclosure, the top cap further comprises a soft pack battery having an output power of less than 5 W.

In accordance with a further aspect of the present disclosure, the top cap and the main body are physically separated and are only electrically connected via a plurality of control signals.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects of the present invention are disclosed as illustrated by the embodiments hereinafter.

BRIEF DESCRIPTION OF THE DRAWINGS

The appended drawings, where like reference numerals refer to identical or functionally similar elements, contain figures of certain embodiments to further illustrate and clarify various aspects, advantages and features of the baby food warmer as disclosed herein. It will be appreciated that these drawings and graphs depict only certain embodiments of the invention and are not intended to limit its scope. The baby food warmer as disclosed herein will be described and explained with additional specificity and detail through the use of the accompanying drawings in which.

Figure 1:
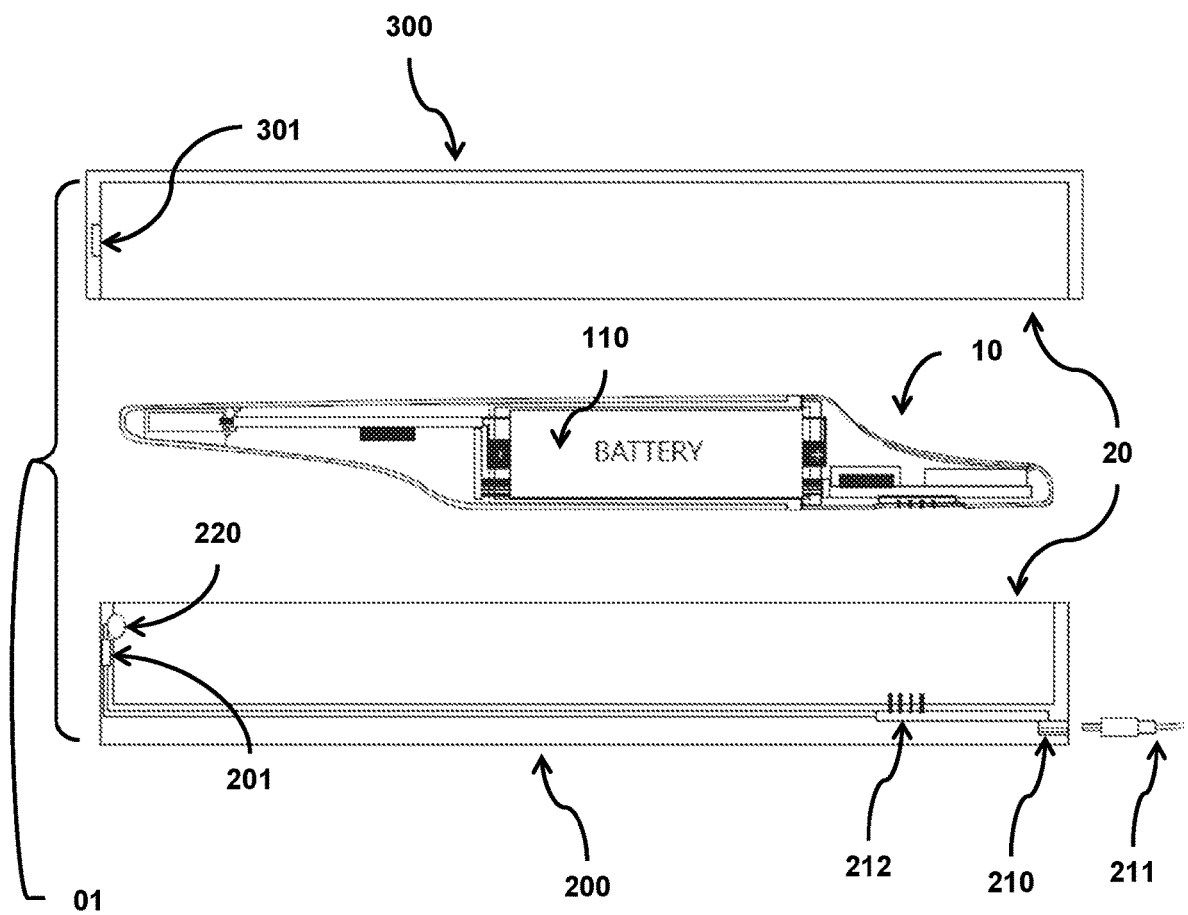
FIG. 1 is a side internal view of the baby food warmer and the charging case thereof in accordance with an exemplary embodiment of the present disclosure.

Skilled artisans will appreciate that elements in the figures are illustrated for simplicity and clarity and have not necessarily been depicted to scale.

DETAILED DESCRIPTION

The present disclosure generally relates to an apparatus which can warm milk and other baby food in a baby bottle. More specifically, but without limitation, the present disclosure relates to a baby food warmer operable as a portable device which can conveniently increase the temperature of milk and other baby food without using an alternating current (AC) power source.

The following detailed description, the baby food warmer is merely exemplary in nature and is not intended to limit the disclosure or its application and/or uses. It should be appreciated that a vast number of variations exist. The detailed description will enable those of ordinary skill in the art to implement an exemplary embodiment of the present disclosure without undue experimentation, and it is understood that various changes or modifications may be made in the function and arrangement of the device of operation described in the exemplary embodiment without departing from the scope of the present disclosure as set forth in the appended claims.

Throughout the specification, milk includes both formula milk and breast milk. Baby food is typically referred to other liquid or semi-liquid dairy products, juice, cereal or other beverages, particularly for babies or infants. The present disclosure is suitable for heating liquid or beverages in a container, a baby bottle, or a bowl, typically between 50 ml and 500 ml. For simplicity, milk and baby food are generally referred to as "food content" in the present disclosure.

The term "micro-controller" or "MCU" as used herein may be formed as one or more digital signal processors (DSPs), general purpose microprocessors, application specific integrated circuits (ASICs), field programmable logic arrays (FPGAs), programmable I/O devices, or other equivalent integrated or discrete logic circuitry.

The term "ultraviolet C", or the abbreviation "UV-C", is used to refer to one type of ultraviolet light having a wavelength from 200 nm to 280 nm. Use of ultraviolet (UV) light, in particular, UV-C light, for sterilization and disinfection is well known. UV light at sufficiently short wavelengths is mutagenic to bacteria, viruses and other microorganisms. Particularly at a wavelength of 254 nm, UV breaks the molecular bonds within micro-organismal DNA, producing thymine dimers in the DNA, thereby destroying the organisms, rendering them harmless or prohibiting growth and reproduction. UV-C radiation also attacks the vital DNA of the bacteria directly. The bacteria lose their reproductive capability and are destroyed. Parasites such as Cryptosporidia or giardia, which are extremely resistant to chemical disinfectants, are also efficiently reduced by UV-C.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Furthermore, the term "about", when used in conjunction with a numerical value or range of values, refers preferably to a range that is within 10 percent, preferably within 5 percent, or more preferably within 1 percent of a value with which the term is associated. The use of any and all examples, or exemplary language (e.g., "such as") provided herein, is intended merely to illuminate the invention better and does not pose a limitation on the scope of the invention unless otherwise claimed. No language in the specification should be construed as indicating any non-claimed element as essential to the practice of the invention.

Terms such as "upper", "lower", "inner", "outer", "front", "rear", and variations thereof herein are used for ease of description to explain the positioning of one element relative to a second element, and are not intended to be limiting to a specific orientation or position. Terms such as "first", "second", and variations thereof herein are used to describe various elements, regions, sections, etc. and are not intended to be limiting.

Terms such as "connected", "in communication with", and variations thereof herein are used broadly and encompass direct and indirect connections, and communication; and are not restricted to electrical, physical or mechanical attachments and connections.

Figure 2:
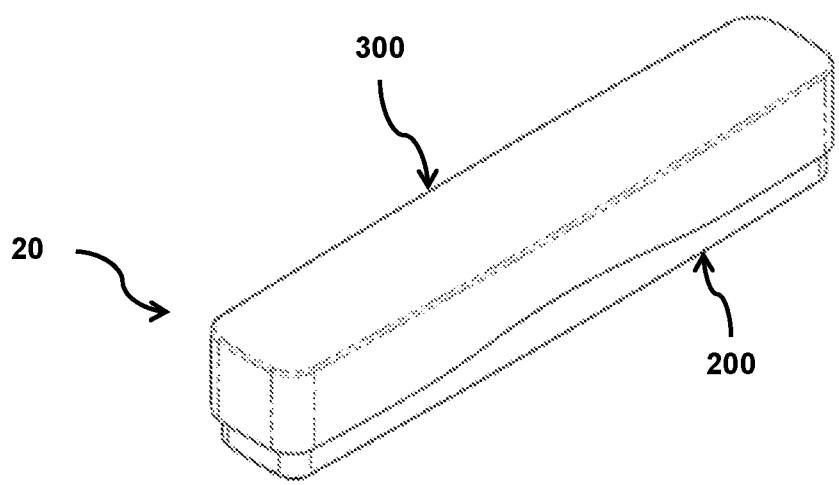
FIG. 2 is a perspective view of the upper cover and the charging base of FIG. 1 when connected and closed.
Figure 3:
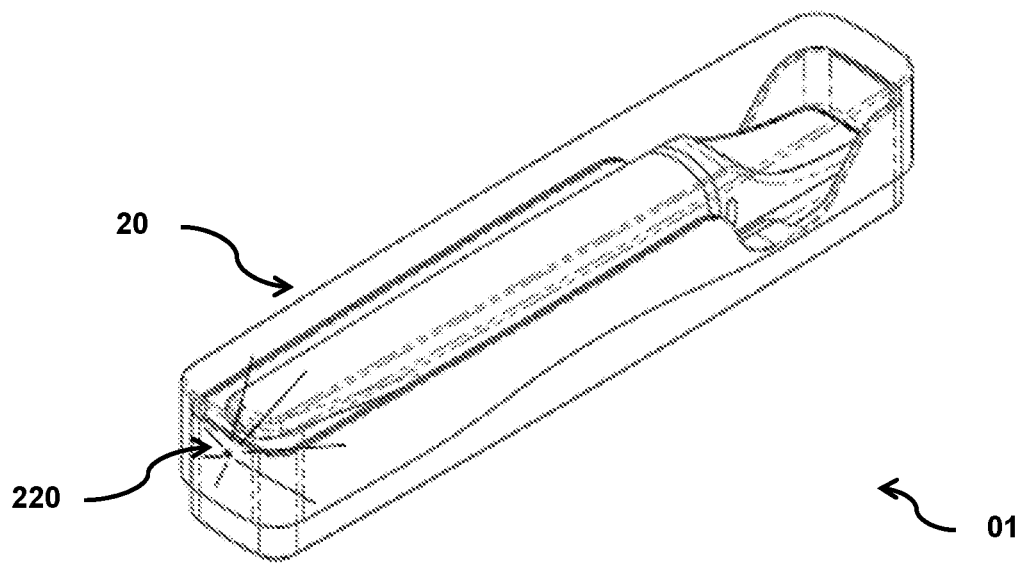
FIG. 3 is an internal view illustrating the sterilization of the baby food warmer of FIG. 1 using UV-C light emitting diode.

FIG. 1 illustrates a side internal view of a baby food warming system 01 comprising a baby food warmer 10 and a charging case 20, wherein the charging case 20 comprises an upper cover 300, and a charging base 200. The baby food warmer 10 can be fit within the internal space formed between the upper cover 300 and the charging base 200 when the charging case 20 is closed. The perspective view thereof is shown in FIG. 2. The charging base 200 further comprises a magnetic switch 201, an UV-C light emitting diode 220, one or more charging pins 212, and a charging connector 210. The upper cover 300 further comprises a magnet 301 in the internal surface of the upper cover 300. The magnetic switch 201 is a magnetically actuated electric switch responsive to a magnetic force, and when the magnet 301 moves sufficiently close to the magnetic switch 201, the magnetic field induced by the magnet 301 is detected and a sensing signal is generated. In one embodiment, the magnetic switch 201 is a reed switch. Therefore, the electronic circuits in the charging base 200 detect whether the upper cover 300 is properly connected to the charging base 200 or not. The sensing signal is coupled to the UV-C light emitting diode 220 as an enable signal such that the UV-C light emitting diode 220 is only switched on when the charging case 20 is closed and the baby food warmer 10 is properly placed within, as demonstrated in FIG. 3. The UV-C light emitting diode 220 is a proven method for sterilization and disinfection, and is switched on for a predetermined period to sterilize the baby food warmer 10. The charging base 200 has a charging connector 210 for connecting to a USB cable 211 to charge the baby food warmer 10 via the charging pins 212. The electronic circuits, including the UV-C light emitting diode 220 and the magnetic switch 201, are powered by the HP battery 110 inside the baby food warmer 10. Therefore, if the baby food warmer 10 is not placed in the charging base 200 or is not correctly connected to the charging pins 212, the UV-C light emitting diode 220 is not powered.

Figure 4:
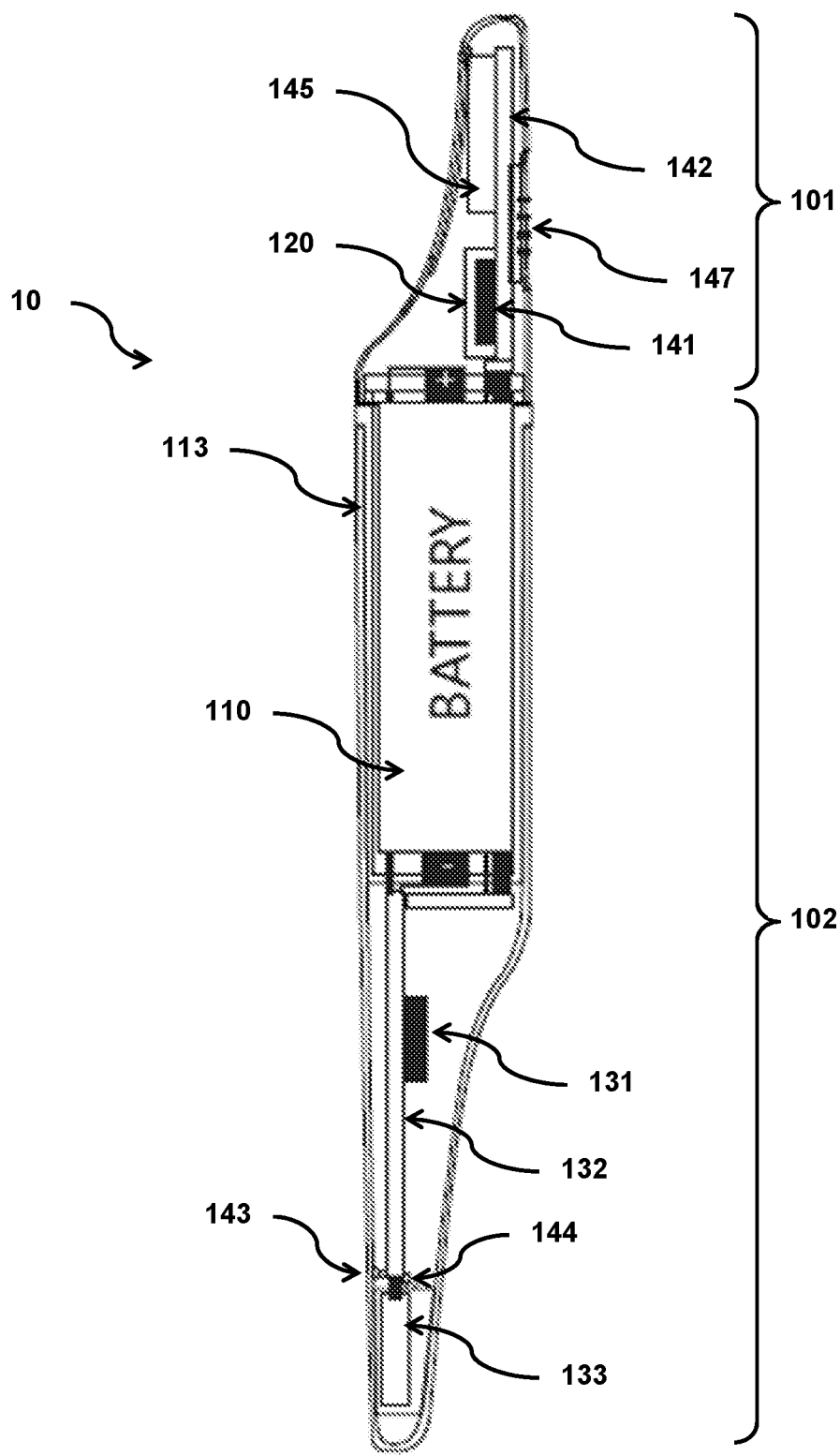
FIG. 4 is an internal side view of the baby food warmer in accordance with an exemplary embodiment of the present disclosure.
Figure 5:
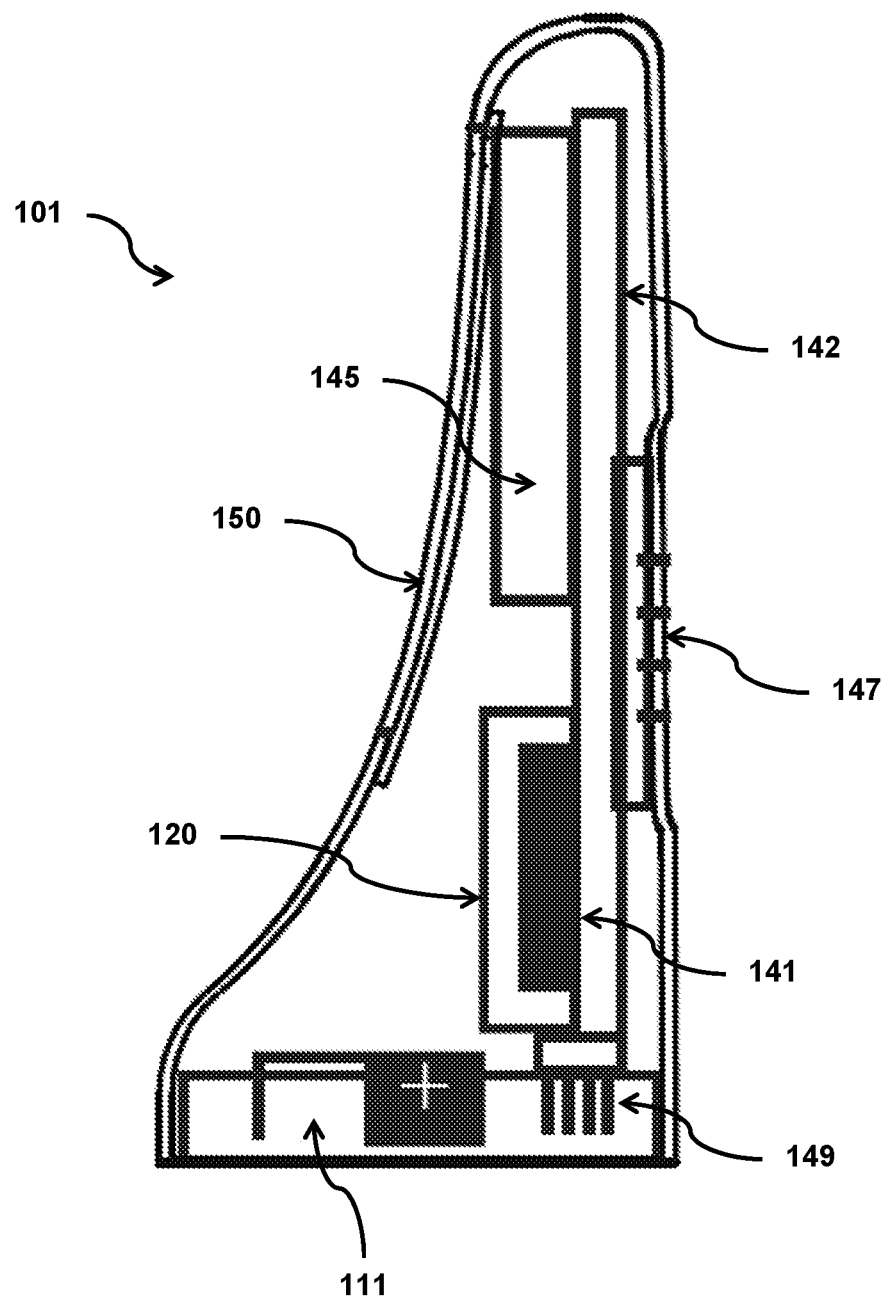
FIG. 5 is an internal side view of the top cap of the baby food warmer of FIG. 4.
Figure 6:
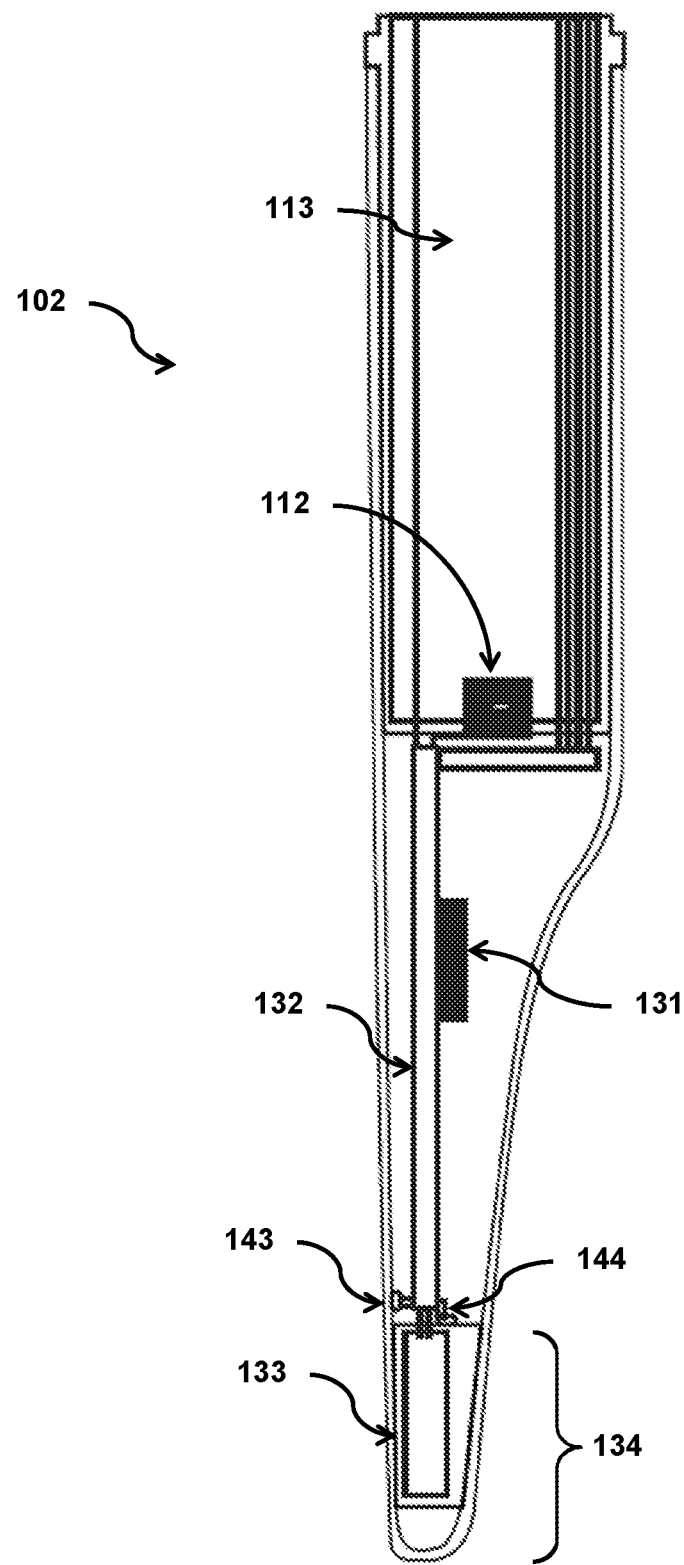
FIG. 6 is an internal side view of the main body of the baby food warmer of FIG. 4.

Referring to FIGS. 4-6, the internal structure of the baby food warmer 10 is depicted. The baby food warmer 10 comprises a main body 102 and a top cap 101 attachable to the main body 102 from above for closing the main body 102. The main body 102 further comprises a battery cavity 113 for fixing a HP battery 110 thereto, a high power printed circuit board (PCB) 132 having a high power micro-controller 131, an external sensor 143, an internal sensor 144, and a temperature regulator 133. The top cap 101 further comprises a low power PCB 142, a liquid crystal display (LCD) 145, a soft pack battery 120, a low power micro-controller 141, and a pin connector 147.

In one embodiment, the top cap 101 has a sharp nose at the top with a streamlined triangular shape on the cross-section. This is exemplarily shown in FIG. 5. The sloped side is curved inwards with a transparent top portion 150 for displaying the images from the LCD 145. The transparent top portion 150 has a plurality of touch sensing electrodes embedded for detecting any touch by the user. In certain embodiments, the sensing electrodes are arranged in an array using the capacitive touch sensing technology and sense the change in capacitance between the electrodes as a result of the touch. In other embodiments, a resistive touch sensing technology may be used instead for detecting any touch by the user.

The low power PCB 142 of the top cap 101 is designed to operate at a relatively lower current than the high power PCB 132 of the main body 102. The power of the low power PCB 142 is preferably less than 5 W. The low power PCB 142 is connected externally to the one or more charging pins 212 of the charging base 200 via a pin connector 147. The soft pack battery 120 is a lithium-ion battery, lithium polymer battery, or other rechargeable batteries, and it is also referred to as "low power (LP) battery". When the baby food warmer 10 is appropriately placed in the charging base 200 for charging the soft pack battery 120, the USB cable 211 is electrically connected to the low power PCB 142.

The low power micro-controller 141 is an electronic device configured to generate a plurality of control signals for controlling the LCD 145 and the temperature regulator 133, to receive a plurality of sensing signals from the external sensor 143 and the internal sensor 144; and to perform analysis thereof. The low power micro-controller 141 can also monitor the status of the baby food warmer 10 for detecting any abnormality of operation. The low power micro-controller 141 can also receive control signals from the plurality of touch sensing electrodes to determine any touch control by the user. The control signals for the components in the main body 102 are routed to a connector socket 149 on the low power PCB 142, which are electrically connected to the main body 102 when the top cap 101 and the main body 102 are connected.

The main body 102 is preferably cylindrical in shape at the upper half with a battery cavity 113 sufficient for fixing a HP battery 110 thereto, and has a sharp lower tip 134 at the bottommost part of the main body 102 with a streamlined triangular shape on the cross-section. An exemplary illustration of the main body 102 is shown in FIG. 6. As the baby food warmer 10 is immersed into the food content in a baby bottle, the temperature regulator 133 is positioned at the lower tip 134 of the main body 102 for enhancing heat transfer to the food content, but may also be located anywhere in the vicinity. The temperature regulator 133 is electrically powered by the HP battery 110, creates heat that causes the temperature of the surrounding walls around the lower tip 134 to rise, which in turn causes heat transfer to the food content which is directly in contact with the lower tip 134. The external sensor 143 is positioned anywhere at the lower tip 134 facing outwardly towards the surrounding wall of the lower tip 134, while the internal sensor 144 is also positioned in the lower tip 134 proximate to the temperature regulator 133 for accurately measuring the temperature thereof.

The high power PCB 132 of the main body 102 is designed to operate at a relatively higher current than the low power PCB 142 of the top cap 101. The power of the high power PCB 132 is preferably more than 50 W for driving the temperature regulator 133. The high power PCB 132 is driver by the HP battery 110. The temperature regulator 133 is controlled by the high power micro-controller 131, by enabling or disabling the temperature regulator 133, and determining the output power of the temperature regulator 133. In certain embodiments, the high power micro-controller 131 can be an electronic relay or a power switch.

Figure 7:
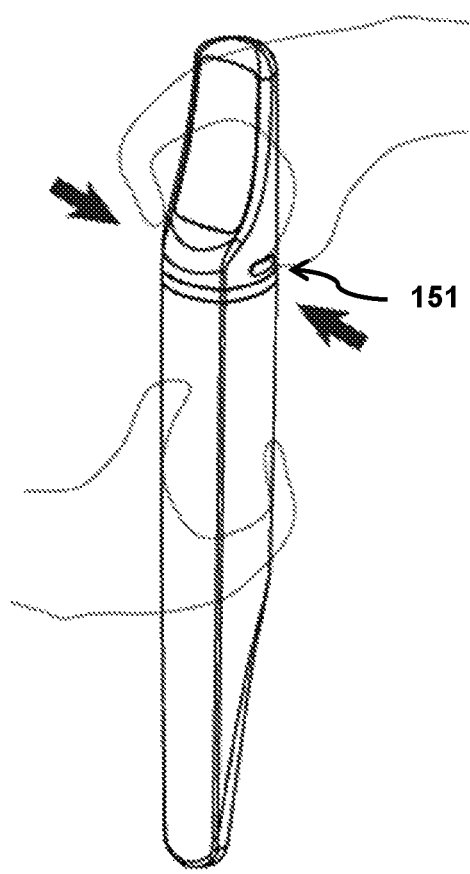
FIG. 7 illustrates the disassembly of the top cap from the main body of the baby food warmer of FIG. 4.
Figures 8, 9:
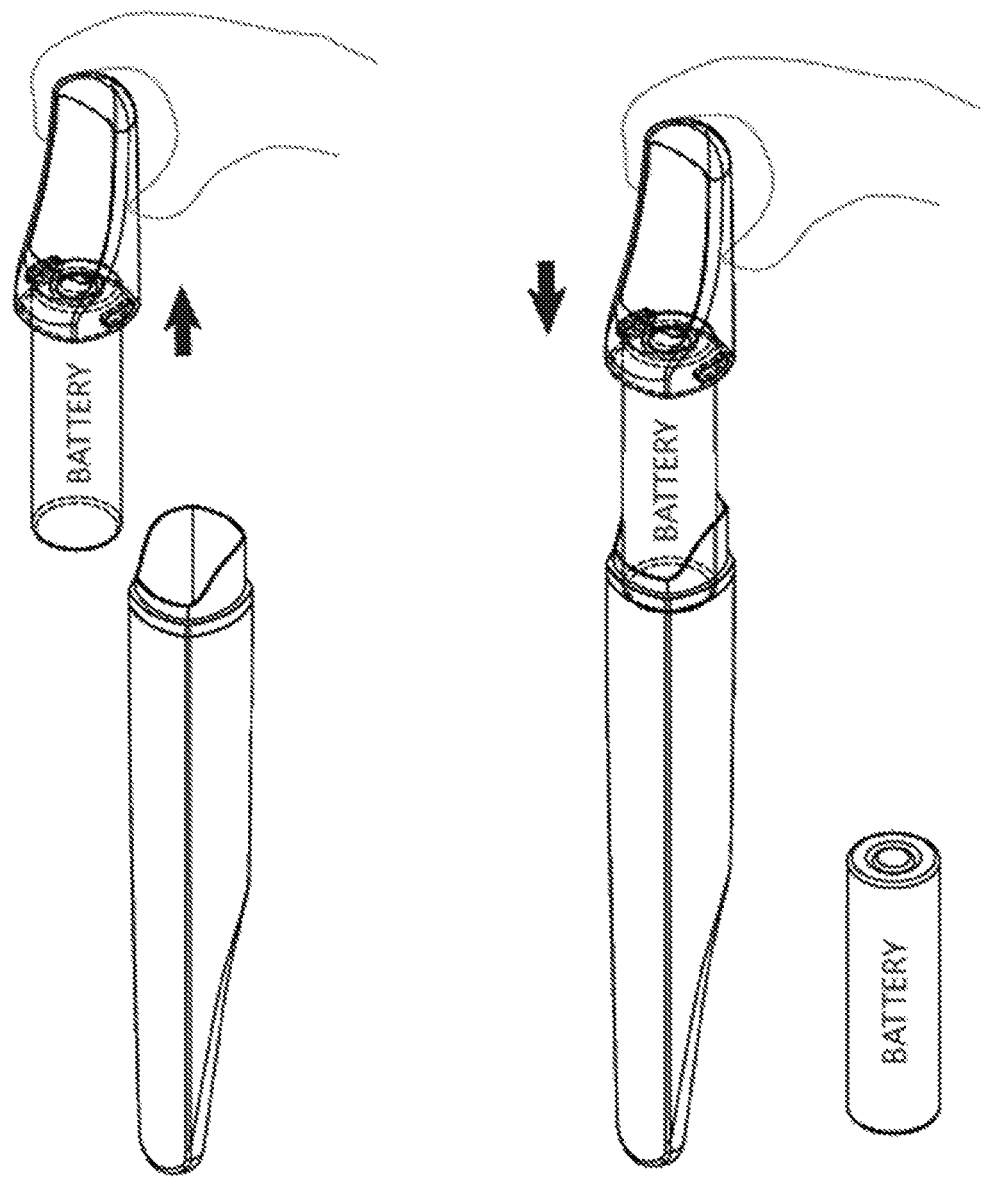
FIG. 8 illustrates the disassembled top cap and the main body of the baby food warmer of FIG. 4.
FIG. 9 illustrates the reassembly of the top cap to the main body of the baby food warmer of FIG. 4.

The HP battery 110 is a single battery with high output power placed within the battery cavity 113 of the main body 102, with the positive end mounted on the positive terminal 111, and the negative end connected to the negative terminal 112. FIGS. 7-9 demonstrate an exemplary embodiment of disassembling the baby food warmer 10 for replacing the HP battery 110. The top cap 101 and the main body 102 can be separated by pressing the mechanical switch 151, and pulling the top cap 101 up from the main body 102. The HP battery 110 is detachably clipped on the positive terminal 111 of the top cap 101, and therefore can be replaced easily.

Figure 10:
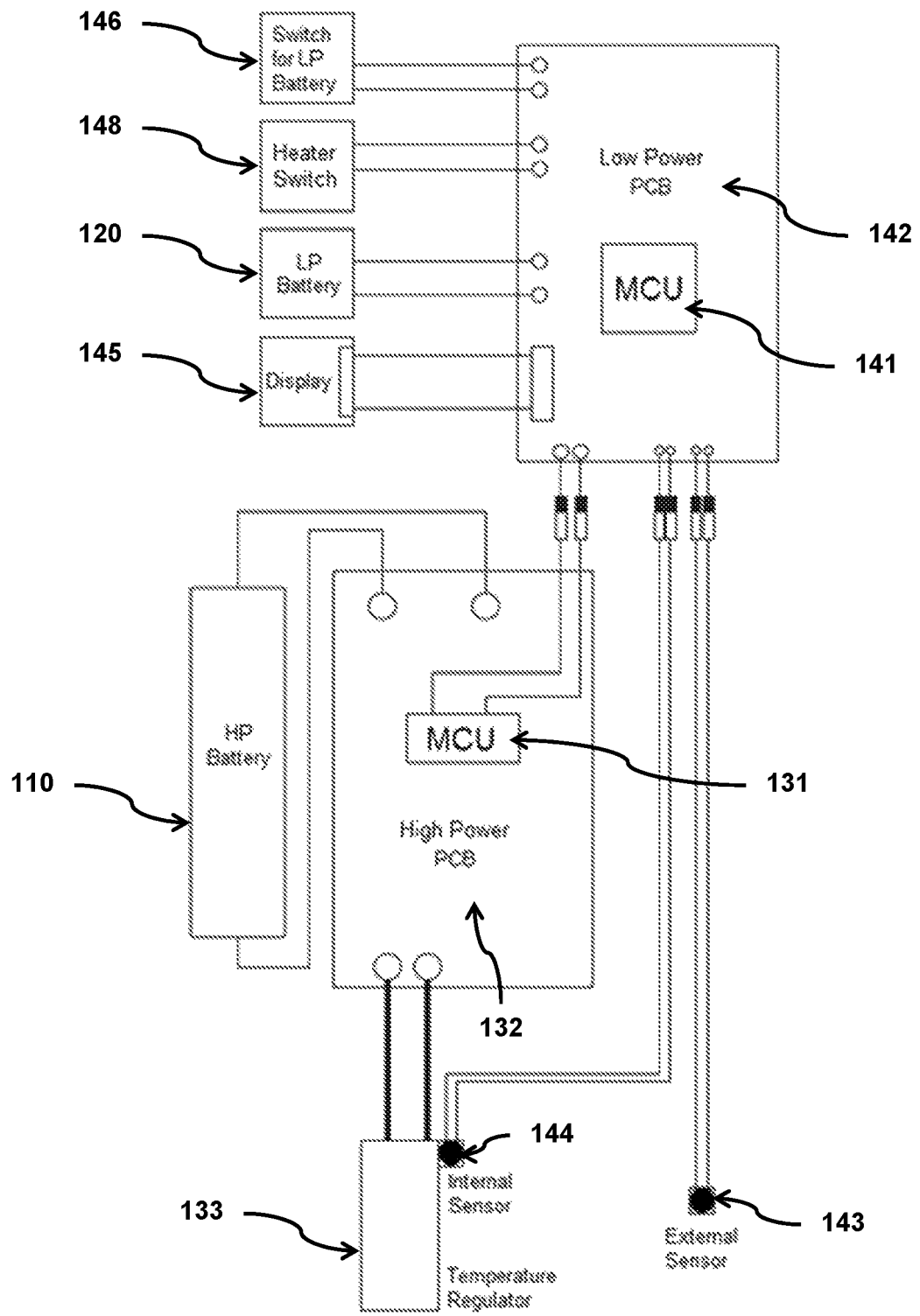
FIG. 10 is a system block diagram for the baby food warmer in accordance with an exemplary embodiment of the present disclosure.

Now referring to FIG. 10, there is shown a system block diagram for the baby food warmer 10 in accordance with certain embodiments of the present disclosure. On the low power PCB 142, there provides a low power micro-controller 141 configured to receiving control signals from the LP battery switch 146 and the heater switch 148, receiving sensing signals from the internal sensor 144 and the external sensor 143, displaying status information on the LCD 145, and controlling the high power micro-controller 131. The LP battery switch 146 is the power switch for the baby food warmer 10. The heater switch 148 is the enabling switch for controlling the temperature regulator 133. On the high power PCB 132, there provides a high power micro-controller 131 configured receiving control signals from the low power micro-controller 141 and controlling the temperature regulator 133. The soft pack battery 120 and the HP battery 110 are separated. The low power PCB 142 and the high power PCB 132 are physically separated and only electrically connected via a plurality of designated control signals. In particular, the power layer and ground layer of the low power PCB 142 and the high power PCB 132 are not connected together. The high power PCB 132 is used to drive the temperature regulator 133, which may involve higher transient voltages and high magnitude spikes. The low power PCB 142 and the components thereon are protected from damage by physical separation from the high power PCB 132 and using filters and other transient or noise suppression devices at the control signals.

When the temperature regulator 133 is disabled by toggling the heater switch 148, the external sensor 143 can also be used to measure the temperature of the food content accurately. The measured temperature can be shown on the LCD 145.

Figure 11:
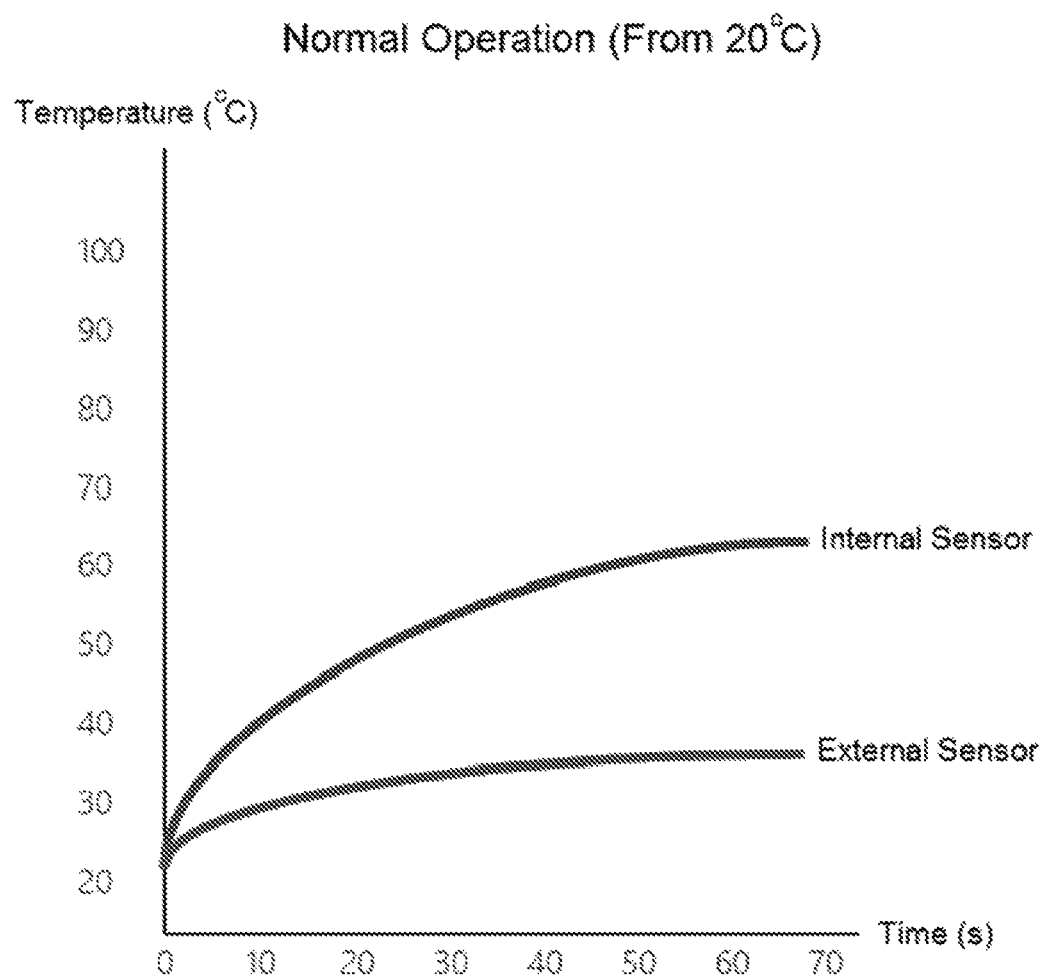
FIG. 11 is a graph showing the temperature of the internal sensor and the external sensor, when the baby food warmer is operating from 20° C.
Figure 12:
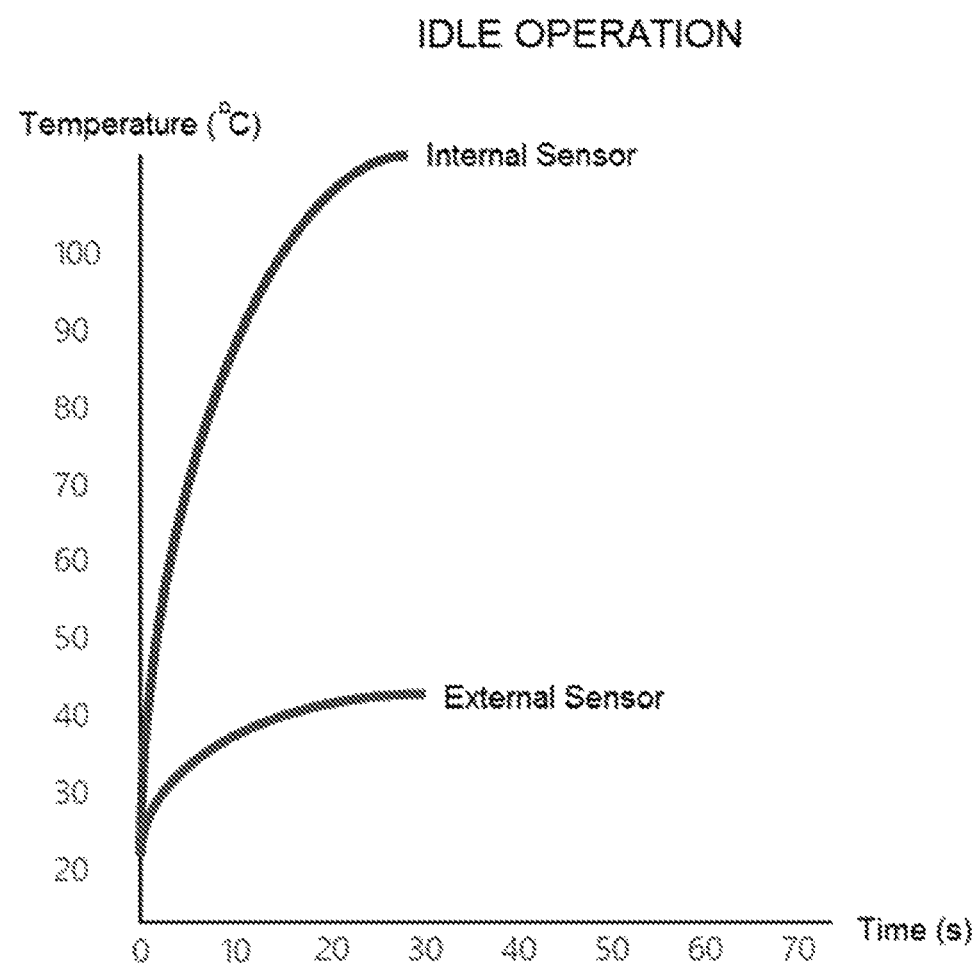
FIG. 12 is a graph showing the temperature of the internal sensor and the external sensor, when the baby food warmer is idle operating.
Figure 13:
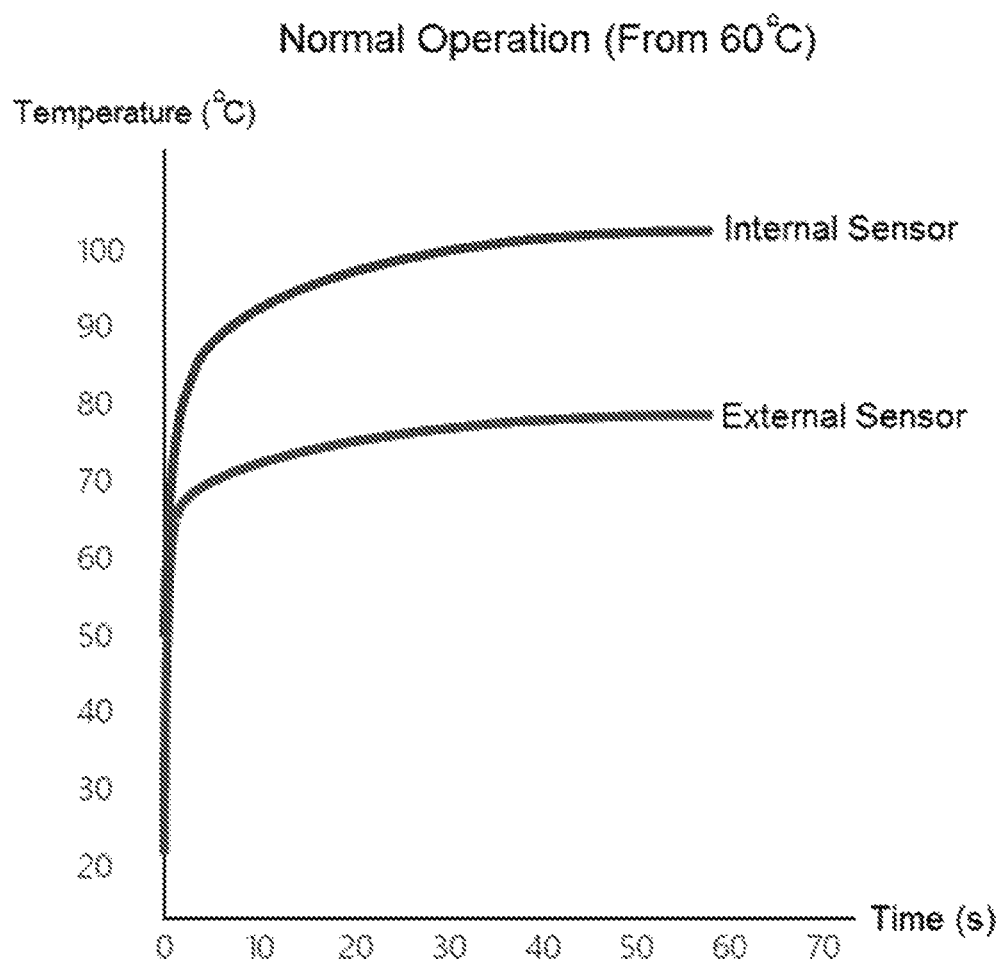
FIG. 13 is a graph showing the temperature of the internal sensor and the external sensor, when the baby food warmer is operating from 60° C.

FIGS. 11-13 are the graphs showing the temperature of the internal sensor 144 and the external sensor 143 in various situations. Advantageous, the low power micro-controller 141 is programmed to execute analysis on the temperature measurements for determining the condition of the baby food warmer 10, and the operation required. The purpose is to avoid the operation of the temperature regulator 133 at idle state without immersing into the baby food, and decrease the power output when the temperature of the food content reaches the target temperature. Operating the baby food warmer 10 at idle state is particularly dangerous and may hurt the user. Therefore, it is important to have a safety mechanism designed to avoid any operation of the baby food warmer 10 at idle state. As shown in FIG. 11, the temperature regulator 133 is switched on at time 0 while the food content and the temperature regulator 133 are at approximately 20° C. The measured temperature of the internal sensor 144 and the external sensor 143 increase gradually to about 60° C. and 37° C. respectively in one minute. The heat energy is first transferred to the food content around the lower tip 134, thereby transfers to the food content further away from the baby food warmer 10. The external sensor 143 can measure the temperature of the food content around the lower tip 134, but not those further away. In order to ensure that a generally uniform heat distribution throughout the food content, the measurement for the external sensor 143 should be stable at the target temperature for a while.

As shown in FIG. 12, the baby food warmer 10 is not immersed into any food content while the temperature regulator 133 is switched on at time 0 with a temperature measurement of approximately 20° C. at the temperature regulator 133 and the surrounding air. Without water as the heat transfer medium, the temperature measurement of the internal sensor 144 is increased faster, and the temperature difference between the internal sensor 144 and the external sensor 143 is drastically large. This may potentially create a hazard situation to the user when the user touches the lower tip 134 of the baby food warmer 10. Therefore, the low power micro-controller 141 is configured to identify an unusual temperature deviation between the sensing signals from the internal sensor 144 and from the external sensor 143, thereby to disable the temperature regulator 133 to avoid the idle operation of the baby food warmer 10.

As shown in FIG. 13, the temperature regulator 133 is switched on at time 0 while the food content and the temperature regulator 133 are at approximately 60° C. The measured temperature of the internal sensor 144 and the external sensor 143 increase gradually to about 100° C. and 78° C. respectively in one minute.

Figures 14, 15:
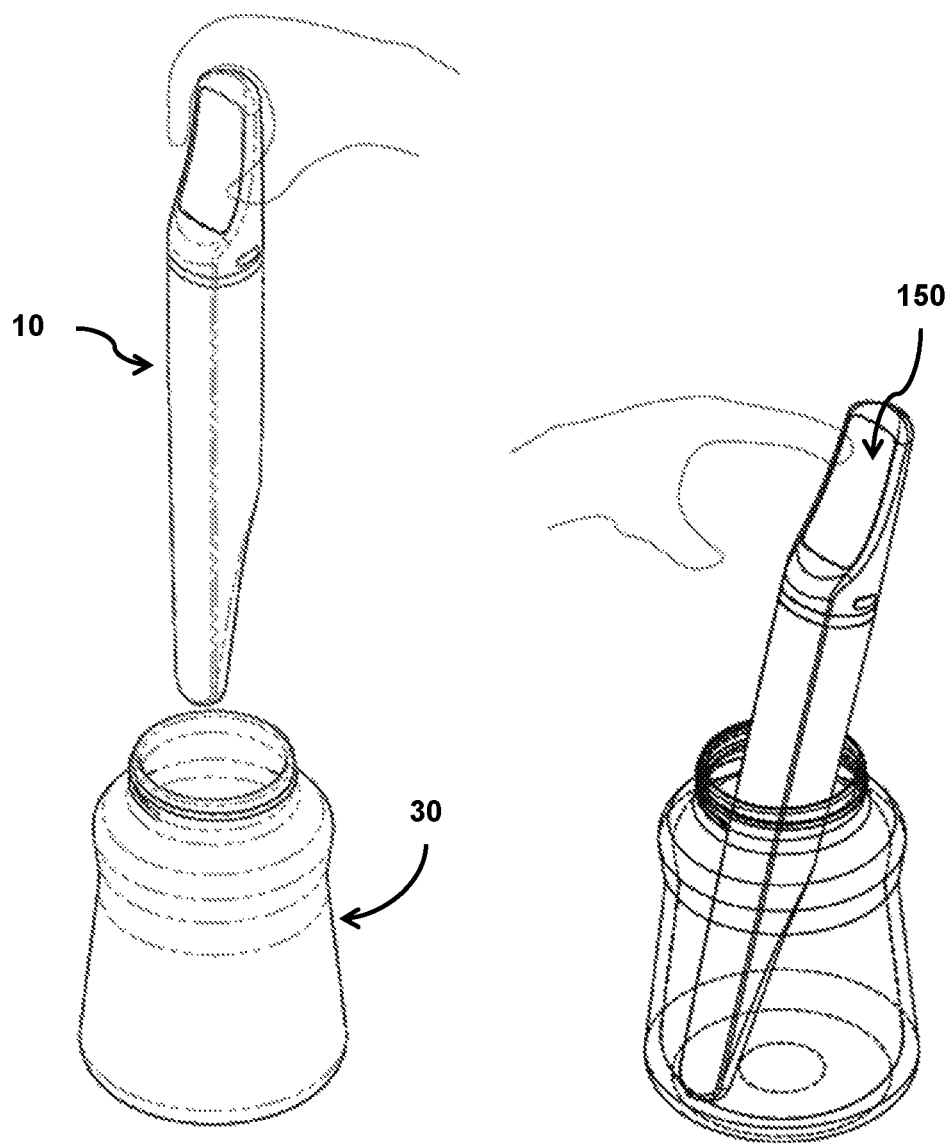
FIG. 14 illustrates the baby food warmer of FIG. 4 before immersing into the baby bottle.
FIG. 15 illustrates the initialization of the baby food warmer of FIG. 4.

FIGS. 14-18 provide the typical operation of the baby food warmer 10. The baby bottle 30 is first filled with food content such as milk or baby food. Next, the baby food warmer 10 is immersed into the food content in the baby bottle 30, as shown in FIG. 15. The food content level should be at least above the lower tip 134 of the baby food warmer 10. The user touches the transparent top portion 150 of the top cap 101 to switch on the temperature regulator 133. The LCD 145 shows information on the status of the baby food warmer 10.

Figure 16:
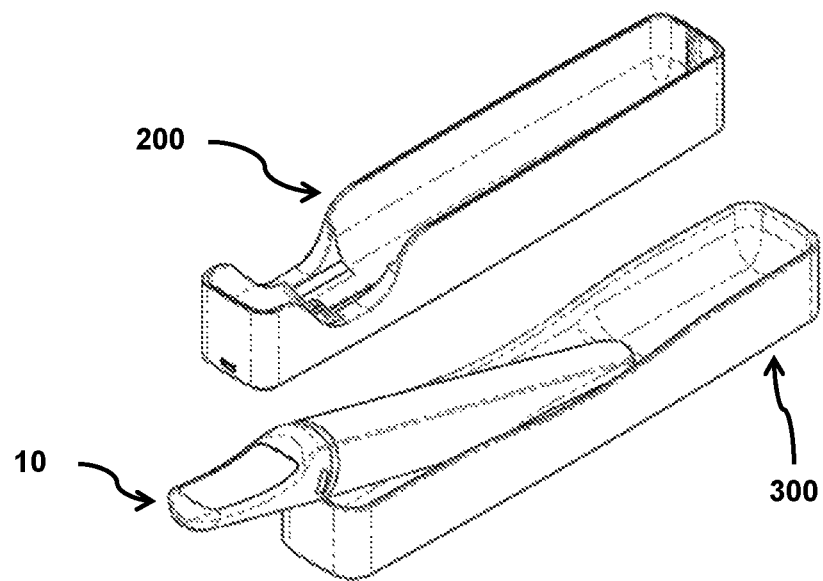
FIG. 16 illustrates a stand-by position for holding the baby food warmer after use of FIG. 4.
Figure 17:
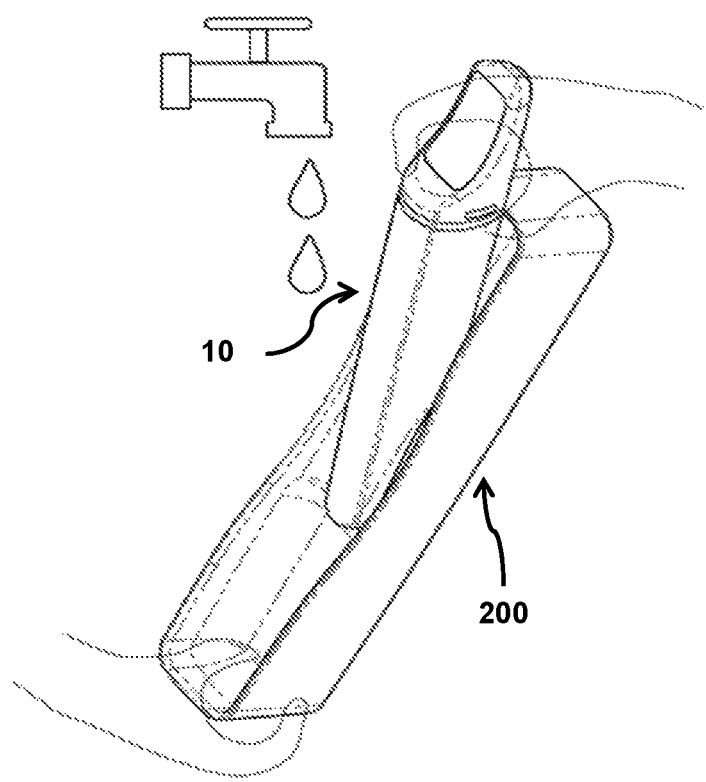
FIG. 17 illustrates the cleaning of the baby food warmer of FIG. 4.
Figure 18:
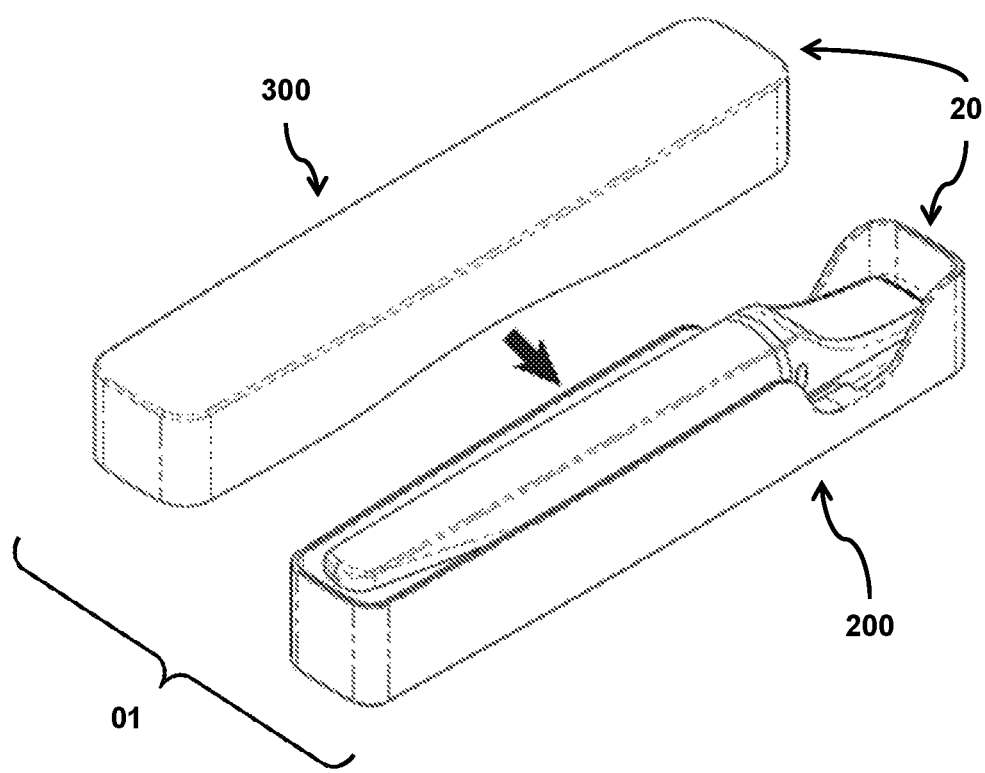
FIG. 18 illustrates the storing of the baby food warmer of FIG. 4.

After using the baby food warmer 10 to warm the food content, the user can take out the baby food warmer 10 and place it on the upper cover 300, as shown in FIG. 16. The user can then feed the baby or infant with the warmed baby food. After feeding, the user can wash the baby food warmer 10 and the upper cover 300, as illustrated in FIG. 17. Finally, as shown in FIG. 18, the user can put the baby food warmer 10 inside the charging case 20 for charging and storage. When the upper cover 300 is closed, the UV-C light emitting diode 220 is switched on to sterilize the baby food warmer 10.

The present disclosure may be embodied in other specific forms without departing from the spirit or essential characteristics thereof. The present embodiment is therefore to be considered in all respects as illustrative and not restrictive. The scope of the disclosure is indicated by the appended claims rather than by the foregoing description, and all changes that come within the meaning and range of equivalency of the claims are therefore intended to be embraced therein.

What is claimed is:

1. A baby food warming system for warming baby food, the system comprising:
   a baby food warmer operable to be immersed into the baby food in a baby bottle, comprising:
      a main body comprising a temperature regulator, a high power printed circuit board for driving the temperature regulator, an external sensor, and an internal sensor, and a battery cavity for fixing a high power battery thereto; and
      a top cap attachable to the main body, comprising a low power printed circuit board;
   wherein:
      the high power printed circuit board operates at first current higher than a second current of the low power printed circuit board;
      the external sensor measures a first temperature of the baby food, and the internal sensor measures a second temperature of the temperature regulator; and the low power printed circuit board comprises a low power micro-controller configured to determine a status of the baby food warmer selected from at least an idle state and an operation state based on a deviation of temperature between the first and the second temperatures, wherein:

the deviation of temperature is small when the baby food warmer is immersed in the baby food, which is determined as the operation state;

the deviation of temperature is large when the baby food warmer is not immersed in the baby food, which is determined as the idle state; and the temperature regulator is disabled at the idle state.

2. The system of claim 1, wherein the external sensor is positioned at a lower tip facing outwardly for measuring the temperature of the baby food.

3. The system of claim 1, wherein the internal sensor is positioned in a lower tip proximate to the temperature regulator for measuring the temperature of the temperature regulator.

4. The system of claim 1, wherein the high power printed circuit board further comprises a high power micro-controller configured to control the output power of the temperature regulator.

5. The system of claim 1, wherein the high power battery has an output power more than 50 W.

6. The system of claim 5, wherein the high power battery is detachably clipped on the top cap, wherein the high power battery is pulled out from the battery cavity by separating the top cap from the main body.

7. The system of claim 1, wherein the top cap further comprises an LCD and a plurality of touch sensing electrodes.

8. The system of claim 7, wherein the low power micro-controller is configured to generate a plurality of control signals for controlling the LCD.

9. The system of claim 1, wherein the top cap further comprises a soft pack battery having an output power of less than 5 W.

10. The system of claim 1, wherein the high power printed circuit board and the low power printed circuit board are physically separated with different ground layers and different power layers for protecting the low power printed circuit board from transient voltages and spikes.

11. The system of claim 10, wherein the high power printed circuit board and the low power printed circuit board are electrically connected via a connector socket when the top cap is attached to the main body.

12. The system of claim 1 further comprising a charging case, wherein the charging case comprises:

an upper cover having a magnet; and a charging base having a magnetic switch, a charging connector, and a UV-C light emitting diode.

13. The system of claim 12, wherein the magnetic switch is a magnetically actuated electric switch responsive to a magnetic force induced by the magnet for determining whether the upper cover is connected to the charging base.

14. The system of claim 13, wherein the magnetic switch is configured to switch on the UV-C light emitting diode when the upper cover is connected to the charging base for sterilization and disinfection of the baby food warmer.

* * * * *